United States Patent [19]

Alinari

[11] 4,196,690
[45] Apr. 8, 1980

[54] DEVICE FOR INDICATING THE MAXIMUM READING OF A MEASURING INSTRUMENT

[76] Inventor: Carlo Alinari, Corso Vittorio Emanuele 200, Turin, Italy

[21] Appl. No.: 948,841

[22] Filed: Oct. 5, 1978

[30] Foreign Application Priority Data

Jul. 21, 1978 [IT] Italy .................. 68739 A/78

[51] Int. Cl.² .............. G01D 13/24; G01F 23/14
[52] U.S. Cl. ......................... 116/293; 73/300; 73/709
[58] Field of Search ............ 116/129 B, 129 A, 296, 116/293; 73/491, 300, 709, 740; 58/85.5

[56] References Cited

U.S. PATENT DOCUMENTS

| | | | |
|---|---|---|---|
| 925,814 | 6/1909 | Jones | 73/491 X |
| 1,755,184 | 4/1930 | Martinet | 73/491 |
| 2,706,962 | 4/1955 | Kobbon | 116/129 A |
| 3,257,794 | 6/1966 | Bennett et al. | 74/575 X |
| 3,703,838 | 11/1972 | Tsuruishi | 74/575 |
| 3,796,101 | 3/1974 | Howard | 116/129 B X |

FOREIGN PATENT DOCUMENTS 255835  9/1976  United Kingdom ................ 116/129 B

*Primary Examiner*—Daniel M. Yasich
*Attorney, Agent, or Firm*—Sughrue, Rothwell, Mion, Zinn and Macpeak

[57] ABSTRACT

A device for indicating the maximum reading of a measuring instrument of the type having a needle turnable over a dial marked with a graduated scale extending for more than 360° includes an auxiliary needle mounted on a pivot pin carried by a transparent screen covering the dial and lightly frictionally engaged with this pin so that it can be turned, for zero setting, by rotation of the pin by means of a knob attached to the outer end thereof. The auxiliary needle is provided with engagement means by which it is engaged by the main needle upon advancing movement, but which allows the main needle to pass the auxiliary needle should it require to do so, having reached a maximum position more than 360° from the zero of the scale so that, upon returning to zero, it passes the auxiliary needle which remains fixed at the maximum position reached. The engagement means comprises a resilient latch including a leaf spring engaged by the main needle in its advancing movement, but resiliently deflected by the main needle as it passes the auxiliary needle in its return movement.

16 Claims, 9 Drawing Figures

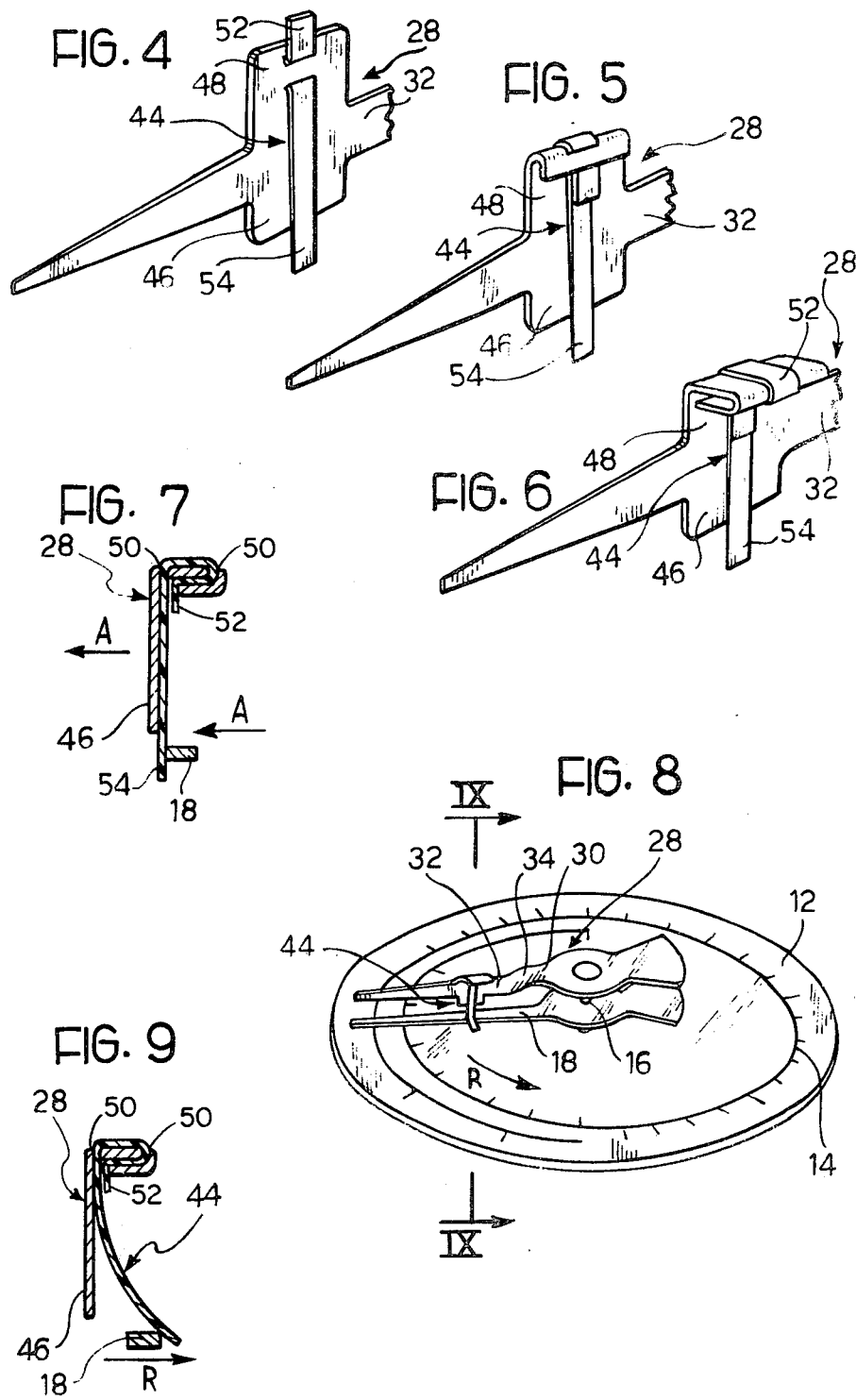

DEVICE FOR INDICATING THE MAXIMUM READING OF A MEASURING INSTRUMENT

BACKGROUND OF THE INVENTION

Many measuring instruments employ devices for indicating a maximum indication sensed by the instrument in a given period of use. Those instruments having a circular dial on which is marked a graduated scale over which a centrally pivoted needle swings conveniently employ a secondary or auxiliary needle which is engaged by the main needle as it moves in the increasing direction of the scale and released when the needle returns towards its zero position. The auxiliary needle is mounted with a slight frictional resistance to movement so that it remains at the greatest reading reached by the main needle when this latter returns to zero. For instruments having a circular dial with a scale extending less than 360° this is perfectly satisfactory, but for instruments the scale of which extends for more than 360°, so that the needle completes more than one revolution upon a full scale deflection, certain problems arise as will be discussed below.

Usually, through the dial of a measuring instrument, extends a spindle which, behind the dial, is mechanically connected to a device sensitive to the physical quantity which the instrument is intended to measure. In front of the dial the spindle carries the main needle which, if the scale on the dial extends for more than 360°, is able, as mentioned above, to turn through more than a complete revolution when the physical quantity which the instrument is intended to measure varies by a sufficient amount.

A known kind of maximum reading indicator device includes a transparent screen which can be fitted to the instrument over the dial; through the screen extends a shaft which, when the screen is mounted on the instrument, is aligned with the main spindle which carries the main needle. On the front of the screen the shaft carried a zero setting knob, and behind the screen it carries an auxiliary needle which is rotatably mounted in a frictional manner to this shaft. The auxiliary needle has engagement means by which the main needle causes it to displace when the main needle moves in a sense corresponding to variation of the physical quantity being measured in the increasing sense of the scale.

The present invention will be particularly described herein as applied to a depth gauge of a type suitable to be worn on the wrist by skin divers, frogmen or others who engage in underwater sports. The invention is, however, not limited to this application, but can be employed in relation to any form of measuring instrument having a dial over which a main indicator needle performs more than a complete revolution of the dial upon full scale deflection from zero.

Depth gauges for skin divers and the like must necessarily be small enough to be worn on the wrist. However, in the case of depth gauges for use at great depth, the scale, in order to allow sufficient resolution of the graduations for accurate reading, must have these graduations sufficiently spaced from one another; this means that the scale must inevitably have an angular extent greater than one revolution of the needle.

Clearly, the simple provision of an auxiliary needle for indicating the maximum depth attained cannot be achieved by means of the usual arrangement, described above, in which the auxiliary needle rigidly carries a projection engageable by the main needle because, if the main needle has completed a deflection greater than 360°, starting from zero, then upon its return to zero it reaches, after one revolution in the reverse sense from the maximum, the other side of the auxiliary needle and therefore pushes it back to the zero position and the indication of the maximum is lost.

In order to overcome this problem there have been devised maximum indicator devices which, in addition to the auxiliary needle, include a third needle freely rotatable about the same axis as the other two. This third needle has a projection parallel to the axis of rotation which extends into the path of both the main needle and the auxiliary needle. This projection of the third needle is disposed in front of the main needle and behind the auxiliary needle with the increasing sense of the scale being considered as "forward". The main needle, in its forward movement, that is in the increasing sense of the scale, engages the projection of the third needle and the third needle engages the auxiliary needle so that all three move forward together. Upon return of the main needle in the reverse sense, that is the decreasing sense of the scale, from a forward movement of more than one revolution, at the completion of a revolution in the reverse sense from the maximum position reached, the main needle engages the projection of the third needle, on the side opposite to that previously engaged and thereby carries it backwardly, away from the auxiliary needle which thus remains fixed to indicate the maximum reading attained by the instrument. In such known maximum indicator devices, the extra complication due to the presence of three needles is a disadvantage, and likewise the added friction of the two extra needles, that is the auxiliary needle and the third needle, which must be overcome by the main needle upon its forward displacement, is also a disadvantage since, for a precision instrument, it is essential that the friction which the main needle must overcome is minimized in order to obtain the greatest possible accuracy.

OBJECTS OF THE INVENTION

One object of the present invention is that of providing a maximum indicator device for a dial instrument having a graduated scale extending for more than 360°, which has a greater constructional simplicity than the known devices mentioned above for such instruments.

Another object of the present invention is to provide a maximum indicator device for a dial instrument, which will be cheaper to produce than known such devices.

A further object of the present invention is to provide a maximum indicator device for a dial instrument having a scale extending for more than 360°, in which the main needle must overcome only the friction of a single auxiliary needle.

SUMMARY OF THE INVENTION

According to the present invention, there is provided a device for indicating the maximum reading of a measuring instrument in a given period of operation for an instrument having a dial on the face of which is marked a graduated scale extending for more than 360°, from a zero position, a spindle extending through said dial, means sensitive to the physical quantity which said instrument is intended to measure, connected to one end of said spindle, a main needle connected to the other end of said spindle, said main needle turning, upon maximum variation of said physical quantity, through an angle of more than 360° from said zero position corresponding to the angular extent of said scale, said device for indicating the maximum reading of said instrument comprising a screen which can be fitted to said instrument in front of said dial, a pivot pin rotatably mounted on said screen and projecting therethrough from front to rear in a position such that upon installation of said screen on said instrument, said pin is aligned with said spindle, a zero setting knob carried by said pivot pin in front of said screen, an auxiliary needle carried by said pivot pin on said rear side of said screen, and latch means carried by said auxiliary needle, said latch means projecting from said auxiliary needle and being weakly resiliently biased into the path of said main needle when said screen is fitted onto said instrument, whereby when said main needle passes said auxiliary needle in a direction corresponding to advancing movement along said scale away from said zero position said latch means interengages said main needle and said auxiliary needle for movement together, but when said main needle passes said auxiliary needle in a direction corresponding to return movement towards said zero position on said scale said latch means is resiliently displaced by said main needle allowing it to pass said auxiliary needle without causing displacement thereof.

The present invention has advantages over known types of maximum indicator device, therefore, inasmuch as there is no third needle, so that the additional friction due to this latter is eliminated.

A maximum indicator device constructed in accordance with the principles of this invention may constitute an accessory to be fitted to an existing instrument or may be formed as part of the measuring instrument itself. In particular the present invention comprehends a depth gauge provided with a maximum indicator device according to the invention.

Other characteristics and advantages of the invention will become apparent from a study of the following detailed description of the preferred embodiment, in which reference is made to the accompanying drawings, given purely by way of non limitative example.

BRIEF DESCRIPTION OF THE DRAWINGS

FIGS. 4, 5 and 6 are fragmentary perspective views of a part of the auxiliary needle in three successive phases of its manufacture;

FIG. 7 is a cross section, on an enlarged scale, of the two needles, taken on the tangential plane indicated by the line VII—VII of FIG. 3;

FIG. 8 is a perspective view similar to FIG. 3, but in which the main and auxiliary needles are shown in the relative positions which they would occupy when the main needle is passing in its return movement the auxiliary needle; and FIG. 9 is a cross section similar to FIG. 7, but taken on the tangential plane indicated by the line IX—IX of FIG. 8.

DESCRIPTION OF THE PREFERRED EMBODIMENT

Figure 1:
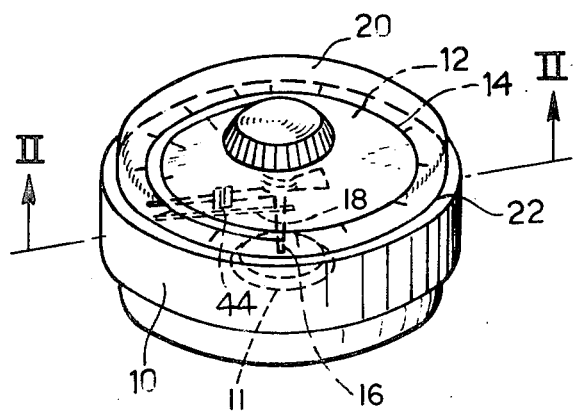
FIG. 1 is a schematic perspective view of a portable depth gauge.

Referring to the drawings, there is shown a portable depth gauge including a casing 10 which encloses a mechanism 11 sensitive to water pressure, such as a manometer capsule. For other types of instrument the mechanism would be sensitive to the physical quantity which the instrument is intended to measure.

The above pressure sensitive mechanism is covered by a dial 12 in the form of a circular plate contained in the casing 10. The dial 12 is marked with a graduated scale 14 calibrated in meters of water, for example from 0 to 90 meters. The scale 14 extends over 540°, corresponding to a maximum of 1½ revolutions of an indicator needle 18 attached to a spindle 16 passing through the centre of the dial 12 and connected mechanically behind the dial to the pressure-sensitive mechanism. When the depth gauge is immersed in water the depth of immersion is sensed by the pressure-sensitive mechanism which thus causes the needle 18 to turn in front of the dial 12 over an angular displacement from the zero position up to a graduation which represents the depth of immersion.

The casing 10 carries a circular transparent screen 20, of glass or plastics material, which is fixed to the casing itself by means of a peripheral metal ring 22 having a radially inwardly directed lip which engages over the peripheral edge of the screen 20. In the centre of the screen 20 there is formed a hole 22 in which is rotatably mounted a pin 24, coaxial with the spindle 16, and sealed in the hole by an O-ring seal 23. The end of the pin 24 facing the spindle 16 has a terminal radial flange 26.

On the pin 24 is rotatably mounted an auxiliary needle 28 which is made of cut and folded sheet steel or similar material and includes a radially inner part 30 lying in its plane of rotation, and a radially outer part 32 separated from the inner part 30 by a 90° twist 34, and which therefore lies in a plane normal to the plane of rotation of the needle to form a narrow line for accurate reading against the scale. The radially inner part 30 of the auxiliary needle 28 is positioned between the radial flange 26 at the end of the pin 24, and a washer 36 against which presses one end of a weak helical spring 38 which surrounds the pin 24. The other end of the spring 38 presses against a washer 40 interposed between it and the transparent screen 20 so that the radially inner part 30 of the auxiliary needle 28 is held on the pin 24 with a slight frictional engagement.

The end of the pin 24 which projects out through the screen 20 carries a knob 42. The slight friction with which the radially inner part 30 of the needle 28 is held, due to the spring 38, between the washer 36 and the shoulder 26, permits the needle 28 to be turned by means of the knob 42 for the purpose of setting it to zero, but this friction can easily be overcome to allow the rotation of the needle 28 when engaged by the needle 18 in the manner which will be described below.

The auxiliary needle 28 carries on its radially outer part 32, a resilient latch element 44 which is constituted by a thin strip of resilient material, for example spring steel or plastics material, having a thickness of the order of a tenth of a millimeter. The manner in which the latch element 44 is held on the auxiliary needle 28 is better illustrated in FIGS. 4, 5 and 6. As can be seen in FIG. 4, the radially outer part 32 of the needle 28 has a lower tongue 46 lying in the plane of the part 32 of the needle and projecting towards the dial of the instrument. The part 32 of the needle also carries an upper tongue 48, projecting in a direction opposite to the lower tongue 46, but lying in the same plane. The upper tongue 48 has a pair of adjacent apertures 50 one above the other.

Upon assembly, one end 52 of the thin resilient strip from which the element 44 is made is threaded into the apertures 50 in the manner illustrated in FIG. 7, passing from one side of the part 32 of the needle 28 to the other through the lower aperture 50 and back from the other side to the said one side through the upper aperture 50. When the strip 44 is thus installed the upper tongue 48 is then folded over a first time on itself (FIG. 5) along a line passing through the upper aperture 50, folding with it the upper part of the strip 44, and then is folded again a second time (FIG. 6) through 90°, along a line which passes through the lower aperture 50 so as to grip the end part 52 firmly.

Figure 2:
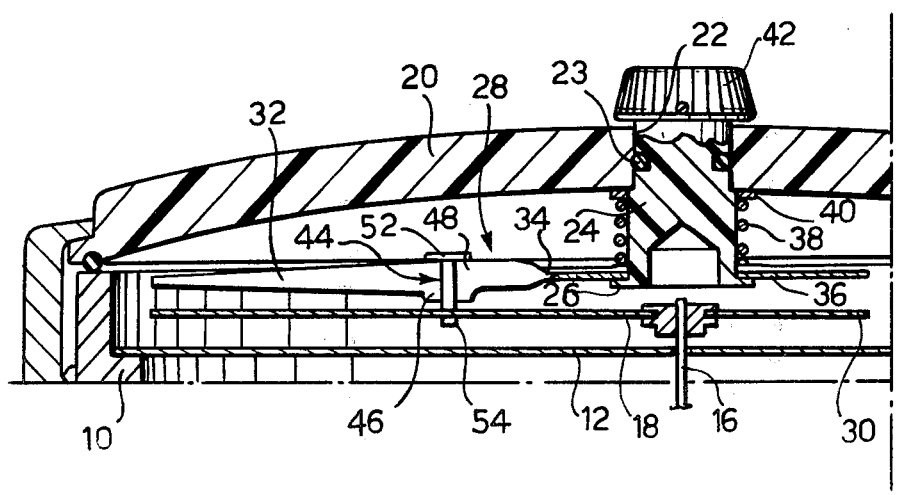
FIG. 2 is a cross section, on an enlarged scale, taken on the diametral plane indicated by the line II—II of FIG. 1.
Figure 3:
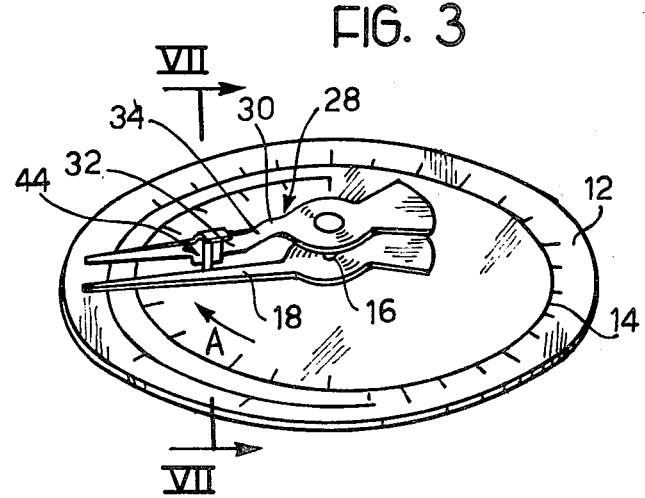
FIG. 3 is a perspective view, also on a greater scale than FIG. 1, showing the dial and two needles of the instrument, showing the needles in a position with the main needle advancing along the scale taking with it the auxiliary needle.

As can be seen in FIGS. 2 and 6, the strip 44, when installed, lies normally, that is when not resiliently flexed, closely against the adjacent face of the lower tongue 46 which faces in the decreasing sense of the scale of the instrument. The free lower end 54 of the small strip projects below the tongue 46 towards the dial 12 for a distance such that, although the tongue 46 is spaced from the path of the main needle 18, the free end 54 of the small strip 44 projects into this path. The device described above operates as follows:

As can be seen in FIGS. 3 and 7, when the main needle 18 advances, that is moves in an increasing sense over the scale (arrow A) it engages the free end of the small strip 44 a little below the edge of the lower tongue 46. In this way the small strip 44 is pressed against the tongue 46 and thus interengages the main needle 18 and the auxiliary needle 28 so that both move together. When the main needle 18 has reached a position corresponding to the maximum value achieved by the physical quantity which is being measured and then moves backwards with the reduction in the value of this physical quantity, it disengages from the free end 54 of the small strip 44 so that the auxiliary tongue 28 remains stationary in the position reached, providing an indication of the maximum.

If the main needle 18 has turned through more than 360° from the zero of the scale 14, when it reaches the maximum then on its return to zero with a fall in the value of the physical quantity being measured, it must pass in the opposite direction past the auxiliary needle 28, which must remain fixed in order to preserve the maximum indication required of it. This is achieved as shown in FIGS. 8 and 9, where the returning direction of the main needle 18 is indicated by the arrow R. As can be seen, as the needle 18 passes the projecting free end 54 of the thin strip 44, this latter deflects resiliently, so that the main needle 18 can move past the auxiliary needle 28 without displacing it, thus retaining the indication of the maximum when the main needle 18 has returned to zero.

What is claimed is:

1. A device for indicating the maximum reading in a given period of operation of a measuring instrument of the type having a dial, scale means on the face of said dial extending for more than 360° from a zero position, a spindle extending through said dial, means sensitive to the physical quantity which said instrument is intended to measure being connected to one end of said spindle and a main needle connected to the other end of said spindle so that upon maximum variation of said physical quantity said main needle will turn through an angle more than 360° from said zero position corresponding to the angular extent of said scale, said device for indicating the maximum reading of said instrument comprising a screen adapted to be fitted to said instrument in front of said dial, a pivot pin rotatably mounted on said screen and projecting therethrough from front to rear in a position such that upon installation of said screen on said instrument said pin will be in alignment with said spindle, a zero setting knob carried by said pivot pin in front of said screen, an auxiliary needle carried by said pivot pin on said rear side of said screen, latch means carried by said auxiliary needle and means resiliently biasing said latch means into a position wherein said latch means will be projected into the path of movement of said main needle when said screen is fitted onto said instrument, said latch means having sufficient resiliency to be deflected away from said projected position by engagement with said main needle in one direction of movement toward said zero position on said scale means, and abutment means on said auxiliary needle to prevent said latch means from being deflected from said projected position by engagement with said main needle in an opposite direction of movement corresponding to advancing movement of said main needle along said scale away from said zero position, whereby when said main needle reaches said auxiliary needle in said opposite direction of movement, said latch means interengages said main needle and said auxiliary needle for movement together but when said main needle reaches said auxiliary needle in said one direction of movement said latch means is resiliently deflected by said main needle allowing said main needle to pass said auxiliary needle without causing displacement of said auxiliary needle.

2. A device as set forth in claim 1, wherein said auxiliary needle has a first part lying in a radial plane parallel to the axis of said pin and said latch means comprises a thin resiliently flexible strip secured at one end to said auxiliary needle with the other end projecting toward said dial when said screen is fitted to said instrument; said strip in a relaxed state lying next to the face of said first part of said auxiliary needle on the side thereof facing towards said zero position.

3. A device as set forth in claim 2, wherein said first part of said auxiliary needle is a radially outer part thereof spaced from said pivot pin.

4. A device as set forth in claim 3, wherein said auxiliary needle is made of malleable material and said thin resiliently flexible strip is attached at one end thereof to said auxiliary needle by a portion of said auxiliary needle being folded over upon itself to clench said one end of said strip.

5. A device as set forth in claim 4, wherein said auxiliary needle has two adjacent apertures through which said one end of said thin strip is threaded before said portion of said auxiliary needle is folded over to clench said one end of said resiliently flexible strip.

6. A device as set forth in claim 5, wherein said portion of said auxiliary needle folded over on itself to clench said one end of said resiliently flexible strip is comprised of a first tongue lying in a plane of said first part of said auxiliary needle and projecting toward said screen prior to being folded over.

7. A device as set forth in claim 6, wherein said first part of said needle further comprises a second tongue lying in the same plane as said first part of said auxiliary needle and projecting away from said screen toward said main needle of said instrument when said screen is fitted thereto but which will not project into the path of movement of said main needle of said instrument.

8. A device as set forth in any of claims 5, 6, 7 wherein said first part of said auxiliary needle is a radially outer part and said auxiliary needle also includes a radially inner part lying in the plane of rotation of said needle and separated from said first part by a 90° twist.

9. A depth gauge having means for indicating the instantaneous and maximum depth readings in a given period of operation comprising a housing, a dial located in the housing having graduated scale means extending for more than 360° from a zero position, a spindle extending through said dial, pressure sensitive means responsive to depth connected to one end of said spindle, a main needle connected to the other end of said spindle for movement along said scale means in response to said pressure sensitive means, a device for indicating the maximum reading of said depth gauge comprising a screen detachably connected to said instrument in front of said dial, a pivot pin rotatably mounted on said screen and projecting therethrough from front to rear in alignment with said spindle, a zero setting knob carried by said pivot pin in front of said screen, an auxiliary needle carried by said pivot pin on said rear side of said screen and latch means carried by said auxiliary needle, means resiliently biasing said latch means into a position wherein said latch means is projected into the path of movement of said main needle, said latch means having sufficient resiliency to be deflected away from said projected position by movement of said main needle in one direction of movement toward said zero position on said scale and abuttment means on said auxiliary needle to prevent said latch means from being deflected from said projected position by said main needle in an opposite direction of movement corresponding to advancing movement of said main needle along said scale away from said zero position whereby when said main needle reaches said auxiliary needle in said opposite direction of movement said latch means interengages said main needle and said auxiliary needle for movement together but when said main needle reaches said auxiliary needle in said one direction of movement, said latch means is resiliently deflected by said main needle allowing said main needle to pass said auxiliary needle without causing displacement of said auxiliary needle.

10. A depth gauge as set forth in claim 9, wherein said auxiliary needle has a first part lying in a radial plane parallel to the axis of said pin and said latch means comprises a thin resiliently flexible strip secured at one end to said auxiliary needle with the other end projecting towards said dial, said strip in a relaxed state lying next to the face of said first part of said auxiliary needle on the side thereof facing towards said zero position.

11. A depth gauge as set forth in claim 10, wherein said first part of said auxiliary needle is a radially outer part thereof spaced from said pivot pin.

12. A depth gauge as set forth in claim 10, wherein said auxiliary needle is made of malleable material and said thin resiliently flexible strip constituting said latch means is attached at said one end thereof to said auxiliary needle by a portion of said auxiliary needle being folded over on itself to clench said one end of said strip.

13. A depth gauge as set forth in claim 11, wherein said auxiliary needle has two adjacent apertures through which said one end of said thin strip is threaded before said portion of said auxiliary needle is folded over to clench said one end of said resiliently flexible strip.

14. A depth gauge as set forth in claim 13, wherein said portion of said auxiliary needle folded over on itself to clench said one end of said resiliently flexible strip is a first tongue lying in the plane of said first part of said auxiliary needle and projecting away from said dial prior to being folded over.

15. A depth gauge as set forth in claim 14, wherein said first part of said needle further comprises a second tongue lying in the said plane as said first part of said auxiliary needle and projecting away from said screen toward said main needle of said instrument when said screen is fitted thereto but which will not project into the path of movement of said main needle of said instrument.

16. A depth gauge as set forth in claims 12, 13 or 14, wherein said first part of said auxiliary needle is a radially outer part and said auxiliary needle also includes a radially inner part lying in the plane of rotation of said needle and separated from said first part by a 90° twist.

* * * * *